Nov. 12, 1963  J. T. BULGER  3,110,354
SAFETY GUARD FOR VEHICLES HAVING AUTOMATIC TRANSMISSIONS
Filed June 26, 1961
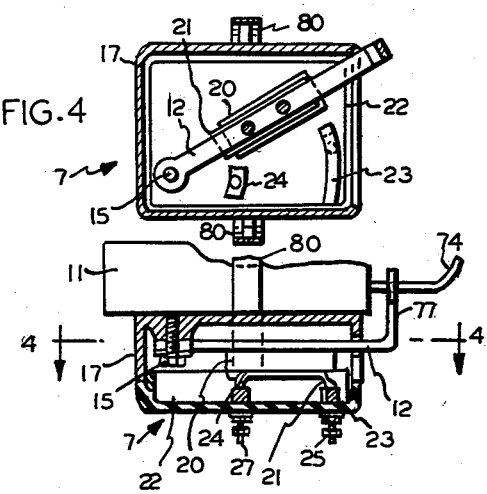
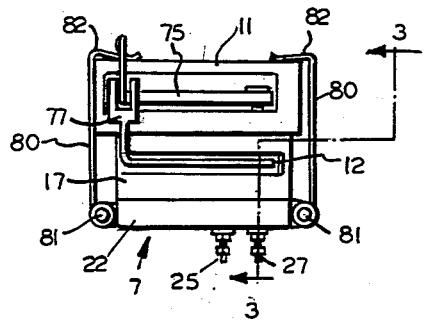
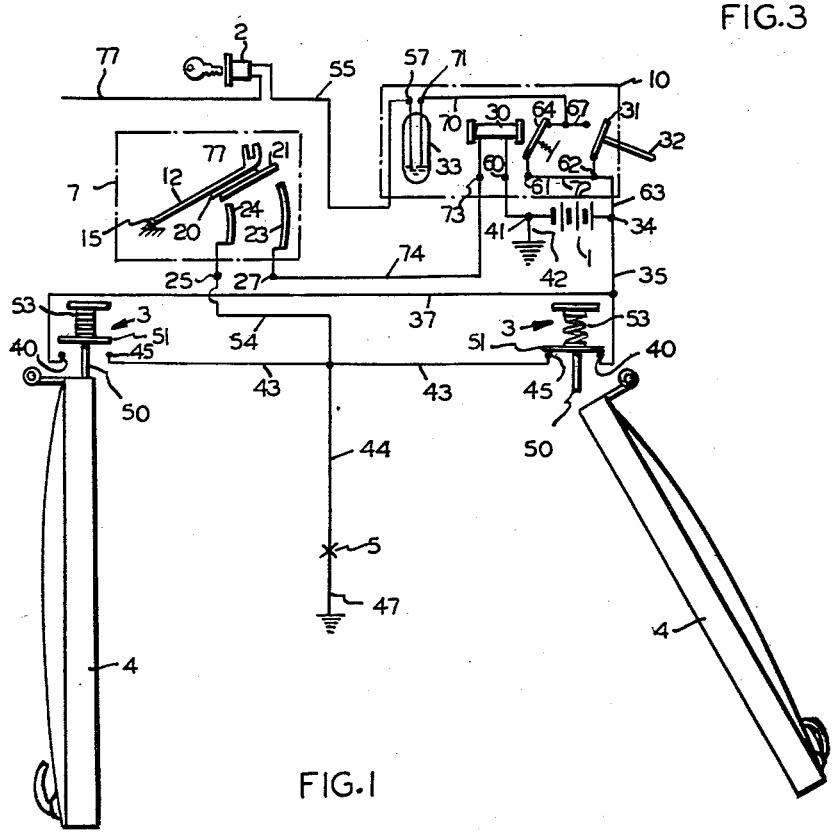
INVENTOR.
JOHN T. BULGER
BY *Henry J. E. Metzler*
ATTORNEY

United States Patent Office 3,110,354
Patented Nov. 12, 1963

3,110,354
SAFETY GUARD FOR VEHICLES HAVING
AUTOMATIC TRANSMISSIONS
John T. Bulger, 763 Meeker Ave., Brooklyn, N.Y.
Filed June 26, 1961, Ser. No. 119,456
1 Claim. (Cl. 180—82)

This invention relates to a new method and means of safety control for automotive vehicles having automatic transmissions. Heretofore attempts have been made to devise a method and means for securing safety to the occupants of an automotive vehicle having automatic drive transmission when the vehicle has stopped temporarily and the transmission is in drive position. However, the heretofore proposed safety means of this type were unpractical, complicated, expensive, heavy and not adapted to be used as widely as is desirable for the prevention of accidents.

By "automatic transmission" is meant that type of automotive drive, such as fluid drive, which is controlled usually by a small lever or the like and does not require the depressing of a clutch. This is in contradistinction to the gear-type of drive in which the gears are manually shifted by a lever, while a clutch is being disengaged simultaneously by pedal action or the like.

When a vehicle that is provided with an automatic transmission is in the condition stated above, there is an ever present danger to the occupants, that the vehicle may move, through forgetfulness on the part of the driver, or by some unintentional application of power. For example, there are proven cases in which the driver has forgotten that he has placed the transmission in drive position and has left the vehicle momentarily and another occupant of the vehicle inadvertently applied pressure to the gas pedal. In one instance the occupant thought that she was applying the brake, and in another instance a child pressed the gas pedal.

Thus, the present invention is directed towards overcoming the above-mentioned danger present in automobiles having automatic transmissions by providing a safety device which completely eliminates this danger.

An important object of the present invention is to provide safety means for use in conjunction with an automobile having automatic transmission so that, if the driver leaves the automobile with the motor running, the opening of either door of the vehicle will automatically stop the motor by interrupting the electrical ignition circuit unless the driver previously has put the gear shift lever into the neutral position, so that no power can be transmitted from the engine to the wheels irrespective of the number of revolutions per minute at which the engine is allowed to run.

Another important object of the present invention is the provision of a device of the character described which consists of only two comparatively small units that can be installed so easily and quickly, and without requiring any structural alterations on a vehicle or its transmission, that the device can be sold at retail as a kit to be attached to a vehicle and connected to its electrical system either by the owner or driver of the vehicle himself, especially if he is somewhat of a so-called "do-it-yourselfer," or which can be installed at a low cost by service stations, automobile accessory dealers or the like. In this way my new and improved device can be made available to the public at very low cost, so that the device may be used widely and can be made obligatory either by law or by stipulation in insurance contracts, without placing a heavy burden on the ultimate user of a vehicle that has an automatic transmission.

Another object of the present invention is the provision of a device of the character described which can be made almost entirely of standard switches and other mass-produced electrical parts, thus reducing to a minimum the original cost as well as any replacement expenses for the device.

A further object of the present invention is the provision of a device of the character described which is specifically well adapted for being added to and installed into existing vehicles although it is also constructed and arranged for ready installation into newly manufactured vehicles of all kinds.

Still another object of the present invention is the provision of a device of the character described which requires only very little additional wiring to be done for its electrical connection to the electrical system of a vehicle, and which needs only so little space that its presence is hardly noticeable.

Yet a further object of the present invention is the provision of a device of the character described which will stop the engine of a vehicle immediately if the vehicle is being driven in an axially inclined position which is beyond certain safety limits, or if by accident, or by playing children, a door should be opened while the vehicle is in motion; this is particularly important in the case of vehicles which have four or more doors.

With the foregoing and other objects which will appear as the description proceeds, the invention consists of certain novel details of construction and combinations of parts hereinafter more fully described and pointed out in the claim, it being understood that changes may be made in the construction and arrangements of parts of the embodiment disclosed without departing from the spirit of the invention as claimed.

In the accompanying drawing I have set forth an illustrative embodiment of my invention.

In said drawing:

FIGURE 1 is a diagrammatic view showing a preferred embodiment of the present invention installed in an automobile;

FIG. 2 is a detailed side view of a contact device attached to a gear shift housing of a vehicle having automatic transmission;

FIG. 3 is a sectional view on the line 3—3 of FIG. 2; and,

FIG. 4 is a sectional view on the line 4—4 of FIG. 3.

Similar reference characters refer to similar parts throughout the several views.

In FIGURE 1 those basic components of the electrical system of an automobile are shown which are of importance for my new and improved drive guard device. These components include a battery 1, an ignition lock-switch 2, switches 3 which are actuated by vehicle doors 4 and which normally switch on and off a light 5. The parts of my safety device preferably are installed in two separate small casings 7 and 10; the casing 7 preferably being attached to the gear lever housing 11 of the vehicle, while the casing 10 may be mounted to any convenient part of the vehicle, for instance to the dashboard beneath the engine hood. A lever 12 is pivotably mounted at 15 to a main portion 17 of the casing 7, and an insulating member 20 is secured to the lever 12. A conductive resilient contact bridge member 21 is mounted to the member 20 in such a manner that it is insulated from the lever 12. A lower portion 22 of the casing 7 is attached to the open lower section of the portion 17, and a pair of arcuated contact rail elements 23 and 24 are mounted within the casing portion 22, so that the elements 23 and 24 together with the elements 20 and 21 forms a circuit breaker. Terminal bolts 25 and 27 are connected to the elements 23 and 24 respectively and are extended through the bottom wall of the casing portion 22.

Within the casing 10 there are mounted a solenoid switch 30, a hand switch 31 adapted to be actuated by means of a handle 32 which extends outside from the casing 10, and an inclination switch 33, which may consist, for instance, of an insulating hollow body containing mercury into which are extended two terminals of conductive members.

Prior to the installation of my new and improved safety device, one terminal 34 of the battery 1 has been connected by wires 35 and 37 to one terminal 40 of each door switch 3, the other terminal 41 of the battery 1 has been connected to ground by a conductor 42, one terminal of the light fixture 5 has been connected by wires 43 and 44 to a second terminal 45 of each door switch 3, and the other terminal of the light fixture 5 has been connected to ground by a connector 47. As long as the doors 3 are closed, as may be seen at the door at the left hand side, a pin 50 of each switch 3 forces a conductive switch contact member 51 away from the terminals 40 and 45, so that no electrical current can pass through the light fixture 5. When any one of the doors 4 has been opened, as is illustrated at the right hand side of FIG. 1, a switch spring 53 forces a contact member 51 against the double contacts 40 and 45, so that an electrical current will pass from the battery 1 through the terminal 34, wire 35, terminal 40, contact member 51, terminal 45, wires 43 and 44, light fixture 5 and conductor 47 to ground.

For connecting my new and improved safety device to the existing wiring system of a vehicle, all that is necessary is to connect the terminal 25 of the casing 7 to the wire 43 by means of a wire 54; to remove an ignition feed wire 55 from the terminal 34 of the battery 1 and connect the wire 55 to a terminal 57 of the inclination switch 33; to connect a terminal 60 of the solenoid of the switch 30 to ground; and to connect the terminal 34 of the battery 1 to the terminals 61 and 62 of the switches 30 and 31 respectively by means of a wire 63. Within the housings 7 and 10 the following conductive connections are made by the factory that makes my safety device: Terminals 64 and 67 of the switches 30 and 31 respectively are connected by a wire 70 to a terminal 71 of the inclination switch 33, the switch terminals 61 and 62 are connected to each other by a wire 72, and a solenoid terminal 73 of the switch 30 is connected by a wire 74 to the terminal 27 on the casing 7.

The lever 12 is connected to a gear shift lever 75, which extends from the housing 11, by any suitable means; in the instance shown, the lever 12 has an angular bifurcated extremity 77 which simply engages both sides of the lever 75, so that the lever 12 will make the same swinging movements as the lever 75. The contact elements are so arranged and located that the member 21 will slide thereupon whenever the gear lever 75 is in any driving position, but not when it is in the neutral position. Thus, while the lever 75 is in the neutral position no electrical current passes through the solenoid of the switch 30, so that the switch 30 is closed. The same is true when all the doors 4 are closed and the lever 75 is in any driving position, in which case, an electrical current passes from the terminal 34 of the battery 1 through the switch 30 to the terminal 64, the wire 70, the inclination switch 33, the wire 55, the lock-switch 2, a wire 77 through the primary part of the ignition system (not shown) to ground. However, if a door 4 is being opened, an electrical current—in addition to the above described light current—passes from the terminal 34 of the battery 1, through the wires 35 and 37, a switch 3, the wires 43 and 54, the terminal 25, the contact element 24, the member 21, the contact element 23, the wire 74, and the solenoid of the switch 30 to ground, so that the solenoid is energized and causes an opening of the switch 30, thus, interrupting the ignition circuit. An interrupting of the ignition circuit can be caused also if the vehicle is inclined along its axis to such an extent that the mercury in the hollow member 33 no longer touches the two conductors which are extended thereinto from the terminals 57 and 71.

In some cases it may be desirable, for testing or repair purposes, to let the engine of a vehicle run while the doors are open. For this purpose the switch 31 can be closed by manipulating the handle 32, which extends beyond the casing 10.

The casing 7 can be attached to the gear lever housing 11 by any suitable means, preferably by means of a pair of resilient clamps 80, which are pivoted at 81 to the lower housing portion 22, and which have angular upper extremities 82 (FIG. 2) which engage the housing 11. This arrangement not only secures the casing 7 to the housing 11 but also attaches the portion 22 to the casing portion 17 in a very simple and efficient manner.

In the case of more than two doors 4, additional switches 3 are arranged parallel to the switches 3 shown in FIG. 1. If there are no door-actuated switches, or if existing door actuated switches are not usable for my safety device, some door-actuated switches can be installed especially for my new and improved drive guard device.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claim is intended to cover all of the generic and specific features of the invention herein described, and all statements of the scope of the invention which as a matter of language might be said to fall therebetween.

Having thus fully described my said invention, what I claim as new and desire to secure by Letters Patent is:

For a motor vehicle having doors, a source of electrical current, a gear shift lever, a gear shift lever housing, and an electrical ignition system for an internal combustion engine as well as door-actuated switches, a kit consisting of a casing having an open portion, a closing member covering the open portion of said casing, resilient clamp members extending from said closing member over said casing and having angular extremities engaging the aforementioned gear shift lever housing so as to secure thereto said casing, a circuit breaker contained in said casing, an actuating lever for said circuit breaker extending from said casing and having a portion engaging the gear shift lever so as to be forced to move in unison with the gear shift lever, a solenoid switch, a manually operated switch, and a container in which said solenoid switch and said manually operated switch are mounted, said kit being installable in the motor vehicle whereby the solenoid which opens said solenoid switch, when energized, is conductively connected by said door-actuated switches to the source of electrical current, and said circuit breaker is interposed between said door-actuated switches and the solenoid of said solenoid switch, said circuit breaker being adapted for interrupting the electrical circuit of said solenoid when the gear shift lever is in a neutral position.

References Cited in the file of this patent

UNITED STATES PATENTS

| | | |
|---|---|---|
| 1,861,800 | Janisch | June 7, 1932 |
| 2,192,262 | Griesedieck | Mar. 5, 1940 |
| 2,740,947 | Davies | Apr. 3, 1956 |
| 2,882,986 | Cash | Apr. 21, 1959 |
| 3,014,549 | Freeman | Dec. 26, 1961 |